UNITED STATES PATENT OFFICE.

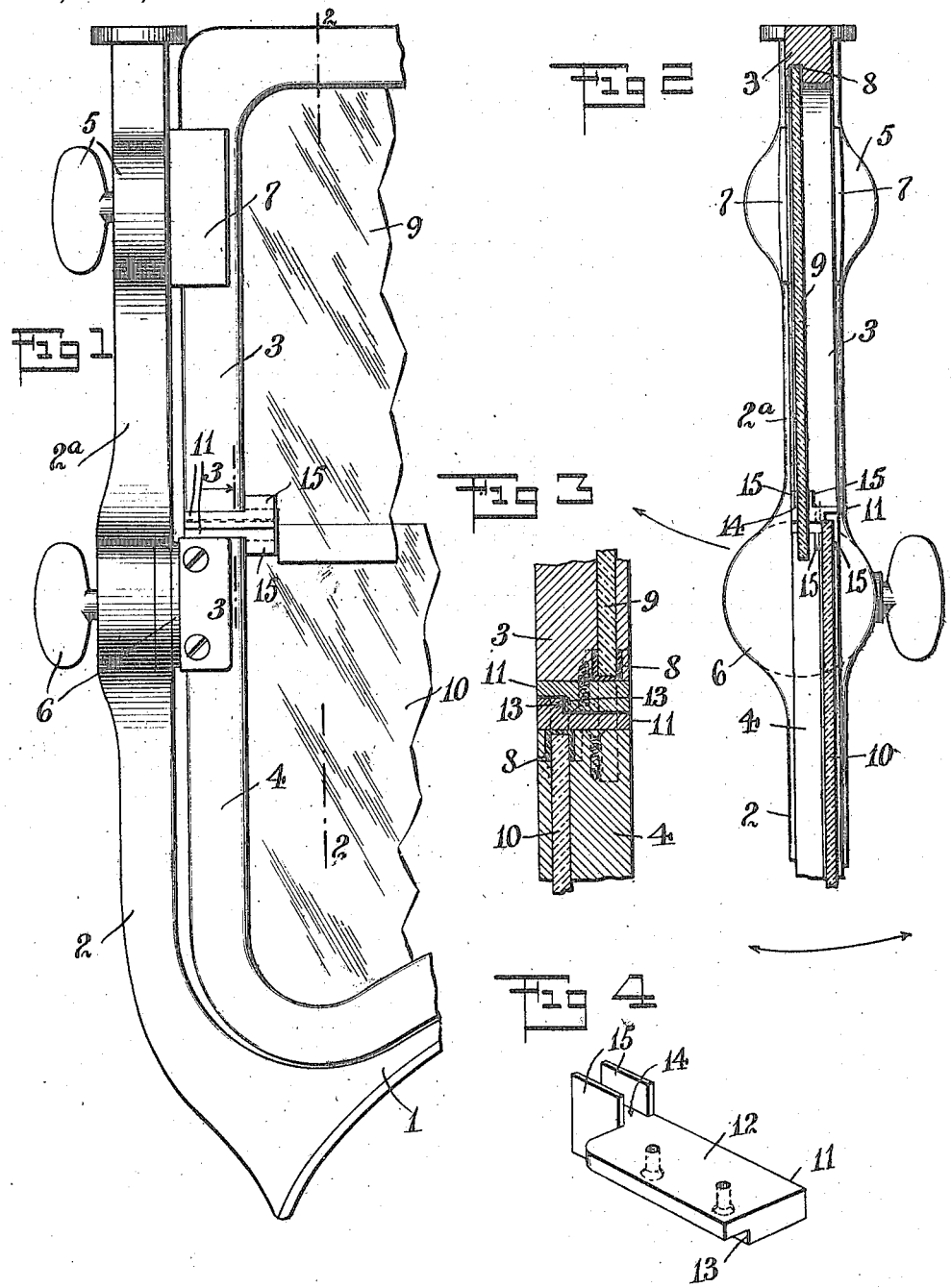

PETER N. LANDINE, OF MILFORD, CONNECTICUT, ASSIGNOR TO THE ROSTAND MANUFACTURING COMPANY, OF MILFORD, CONNECTICUT, A CORPORATION OF CONNECTICUT.

WIND-SHIELD.

1,161,230.

Specification of Letters Patent.

Patented Nov. 23, 1915.

Application filed March 6, 1915. Serial No. 12,490.

*To all whom it may concern:*

Be it known that I, PETER N. LANDINE, a citizen of the United States, residing at Milford, New Haven county, State of Connecticut, have invented certain new and useful Improvements in Wind-Shields, of which the following is a full, clear, and exact description.

This invention relates to wind shield construction, and aims to provide a simple and efficient structure of this character.

The various objects of the invention will be more apparent from a reading of the specification taken in connection with the accompanying drawings forming a part thereof and illustrating one embodiment of the invention.

In these drawings: Figure 1 is a fragmentary view in front elevation of a wind shield constructed in accordance with the present case. Fig. 2 is a vertical section on the line 2—2, Fig. 1, Fig. 3 is a vertical section on the line 3—3, Fig. 1, and on an enlarged scale. Fig. 4 is a perspective view of a detail of construction.

Referring to these drawings by numerals, 1 designates the base of the outer frame of a wind shield structure; 2 one of the sides, which may have, if desired, a swinging upper portion 2ᵃ, these parts being of standard construction. The base 1 is shaped to fit the particular form of dash desired. I have only shown one side of the outer frame and of the wind shield frames carried thereby, inasmuch as the opposite side is merely a reversed duplicate.

The wind shield proper comprises upper and lower shield frames 3 and 4 mounted within the outer frame to swing relatively to each other by means of the hinge joints 5—6, which hinge joints may be of any desired construction. The shield frames 3 and 4 in normal fully closed position are in vertical alinement, and similar in construction, although in the position shown they are reversed. The frame 3, as will be seen is attached at 7 to the hinge joint of the upper portion 2ᵃ of the outer frame. The frame is formed with two side members and a top member, all preferably integral, there being a channel 8 extending around the inner edges of the frame designed to receive the glass 9 forming the shield or screen. The lower shield section 4 is of similar construction though reversed, the base of the frame being shaped to correspond to the dash portion 1 of the outer frame and being channeled in a similar manner to receive the glass screen or shield 10. The adjacent horizontal edges of these screens are designed to overlap. Preferably, the upper screen 9 extends down below the upper horizontal end of the lower screen 10. The purpose of this is to make the screen "rainproof". Frequently in the type of wind shield wherein the adjacent horizontal edges of the screen sections are slightly separated, rain or snow will beat upon the wind shield and will drip to the lower end of the shield and thence will be driven by the wind into the face of the driver of the car. If the upper screen section, for instance, overlaps and extends below the upper edge of the lower screen section, this action cannot take place. This is also true within limits when the upper screen section is swung outwardly for ventilation or other purposes. The amount of overlap may be varied within wide limits as desired, and I do not care to limit myself in this regard. In order to provide this overlap and also a means for preventing the overlapping portions of the glass screen from contacting, which in some cases would result in breakage, I have shouldered off the lower overlapping edge of the upper screen on a line substantially parallel and closely adjacent the upper edge of the lower screen, and from the vertical side edges of this upper screen inwardly for a short distance, the screen extending thence downwardly to provide the overlap as will be more clearly apparent from Figs. 1 and 2 of the drawings.

The plane of the channel of the frame in the lower frame 4 in which the screen is adapted to be seated, is laterally offset from the plane of the channel 8 in the upper shield frame 3, the two frames in this respect being substantial duplicates reversed. There will, therefore, be a space between the overlapping horizontal edges of the screens 9 and 10. Inasmuch as these screen frames are mounted for swinging movement relatively to each other, it would be possible to bring the overlapping ends into contact, frequently breaking them, unless means are provided for preventing such contact upon movement of the frames in contacting direction. One such means which I preferably employ, consists of stop plates 11 mounted at the adjacent horizontal edges of the screen plates in line with the shouldered-off portion of the upper screen 9. The sides of the frames 3 and 4 are cut down so that these plates when superposed thereon and secured thereto will abut on the line approximately of the upper edge of the lower screen. As the construction of each of these plates is, in all material respects, the same, a description of one in detail is sufficient. These plates will have one face 12 designed to be secured as by screws to the end of the frames 3 and 4. The opposite face is cut down to form a stop shoulder 13 which will extend transversely of the screen. The plate is provided at its outer end with a transverse extension 14 having ears 15 extending from the edges thereof. These ears and the offset 14 are designed to engage the edge of the glass screen inwardly of the frames 3 and 4, as will be seen by reference to Fig. 1 of the drawing. These stop plates will be made in pairs—i. e., "rights" and "lefts" for the opposite ends of each screen. Inasmuch as they are reversely arranged on one screen relatively to the other, their shoulders 13 will abut when the frames 3 and 4 are in normal screen closed position and in vertical alinement. In this position the overlapping ends of the glass screens 9 and 10 are held spaced apart by the contacting shoulders 13 (Fig. 3) of the stop plates. If the upper screen 9 has been held in an outwardly inclined position and is released, it will swing downwardly by gravity, but the shoulders 13 on the stop plates of the two screen sections will engage before the screens themselves can contact thereby preventing breakage, (see Fig. 3). The lower screen frame 4 may not be moved on its hinge joint relatively to the upper screen frame 3, and in a direction to bring the screens into contact, because of the shoulders 13, and the adjacent faces of the plates, which in normal closed position of the screen frames, will prevent any such movement on the part of the lower screen frame.

By having the screens carried by their respective frames in laterally offset and, in this case substantially parallel planes, these frames may be of the same size, and, therefore, will have a neat appearance and will not present any bulky lines to the eye. Furthermore, by so mounting the screens they may be overlapped at their adjacent horizontal edges so that the rain may not blow from the lower edge of the upper screen back into the body of the automobile, inasmuch as the overlap will cause the water, etc., to bring up against the lower screen section. By providing a substantial amount of overlap this same rain-proof function is secured, even if the upper screen frame is swung outwardly at a substantial angle on its hinge joint.

The terms "horizontal" and "vertical" as used in this specification and in the appended claim, are intended to be used in the sense of "substantially" horizontal or vertical, and apply to the parts to which they are attributed when the latter are in their normal positions of use.

I have herein described a particular embodiment of my invention, but desire it understood that the same is susceptible of structural modification within the spirit of the invention and the scope of the appended claim.

What I claim therefore and desire to secure by Letters Patent is:

In combination, a supporting frame, open sided shield frames pivotally supported in said supporting frame with their open sides normally facing toward each other, transparent shields let into the open sides of said shield frames and arranged to have their adjoining edges at the open sides of the frames overlap, and stop plates secured to the ends of the frames at the open sides thereof, said stop plates being engaged over the edges of the shields to thereby secure the shields in the frames and provided with stop shoulders engaging as the frames are rotated toward each other to prevent engagement of the overlapping edges of the shields.

PETER N. LANDINE.

Witnesses:
K. FRANCES MAGINN,
A. L. HICKEY.

Copies of this patent may be obtained for five cents each, by addressing the "Commissioner of Patents, Washington, D. C."